United States Patent [19]

Lemmon et al.

[11] 4,096,880
[45] Jun. 27, 1978

[54] CARTRIDGE VALVE

[75] Inventors: John C. Lemmon; Donald R. Olson, both of Salem; Dean E. Zepernick, Hanoverton, all of Ohio

[73] Assignee: Hunt Valve Co., Inc., Salem, Ohio

[21] Appl. No.: 723,320

[22] Filed: Sep. 15, 1976

[51] Int. Cl.$^2$ ................................................ F16K 3/26
[52] U.S. Cl. ............................. 137/454.2; 137/625.68
[58] Field of Search ............... 137/454.2, 454.6, 454.5, 137/625.68, 625.69, 625.67

[56] References Cited

U.S. PATENT DOCUMENTS

| | | | |
|---|---|---|---|
| 2,645,450 | 7/1953 | Chessman | 137/625.68 |
| 3,487,435 | 12/1969 | Sheardown | 137/454.6 |
| 3,648,733 | 3/1972 | Hahn | 137/625.69 |

FOREIGN PATENT DOCUMENTS

| | | | |
|---|---|---|---|
| 616,203 | 3/1961 | Canada | 137/625.69 |
| 645,277 | 7/1962 | Canada | 137/625.69 |

*Primary Examiner*—Alan Cohan
*Attorney, Agent, or Firm*—Michael Williams

[57] ABSTRACT

A valve construction, particularly a three-way, two-position valve which may be used by itself to control fluid flow, or which may be used as a pilot valve to control operation of a larger valve. The valve comprises a cartridge which may be installed within or removed from the bore of a valve body as a unit. The cartridge unit comprises a valve plunger, a plurality of similar glands, and a plurality of similar separators carried by the plunger, with static seals on the glands and dynamic seals between separators, and a spring for urging the plunger to a predetermined position.

The cartridge unit is held within a body bore by means of a cartridge nut which is threaded into one end of the bore. The nut has one end bearing against a separator at one end of the cartridge unit and presses a separator at the other end of the unit against a fixed abutment in the bore, so that axial movement of the plunger does not cause separation of the glands and separators.

16 Claims, 8 Drawing Figures

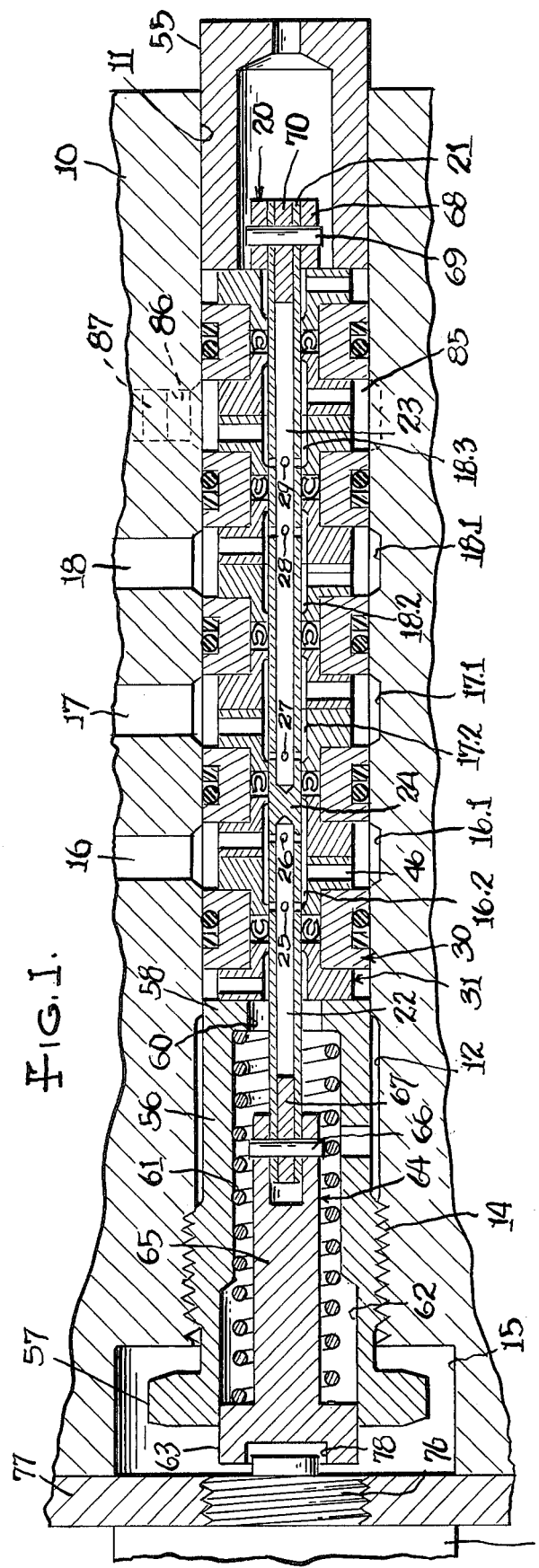
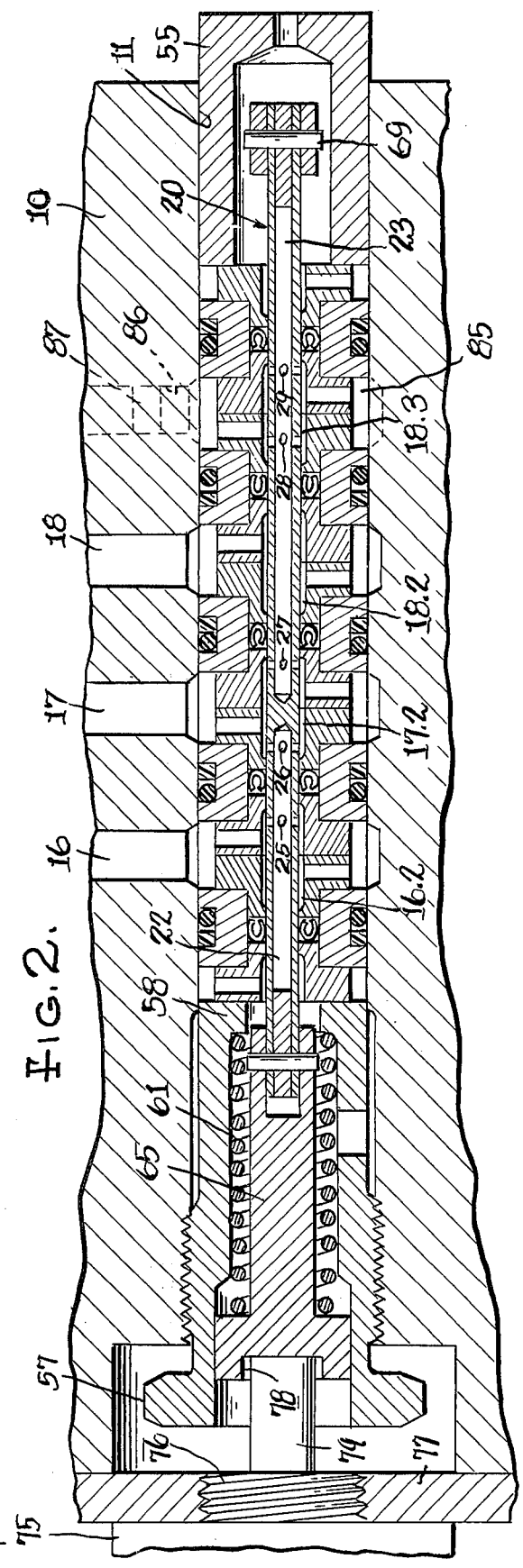

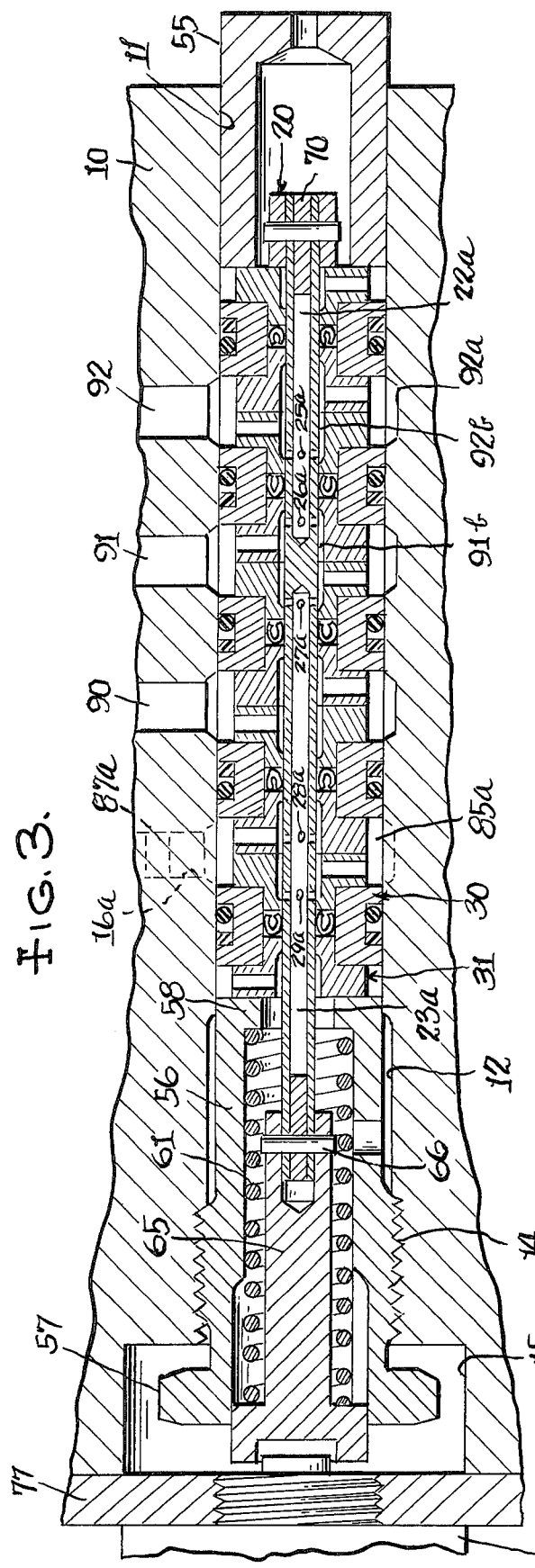
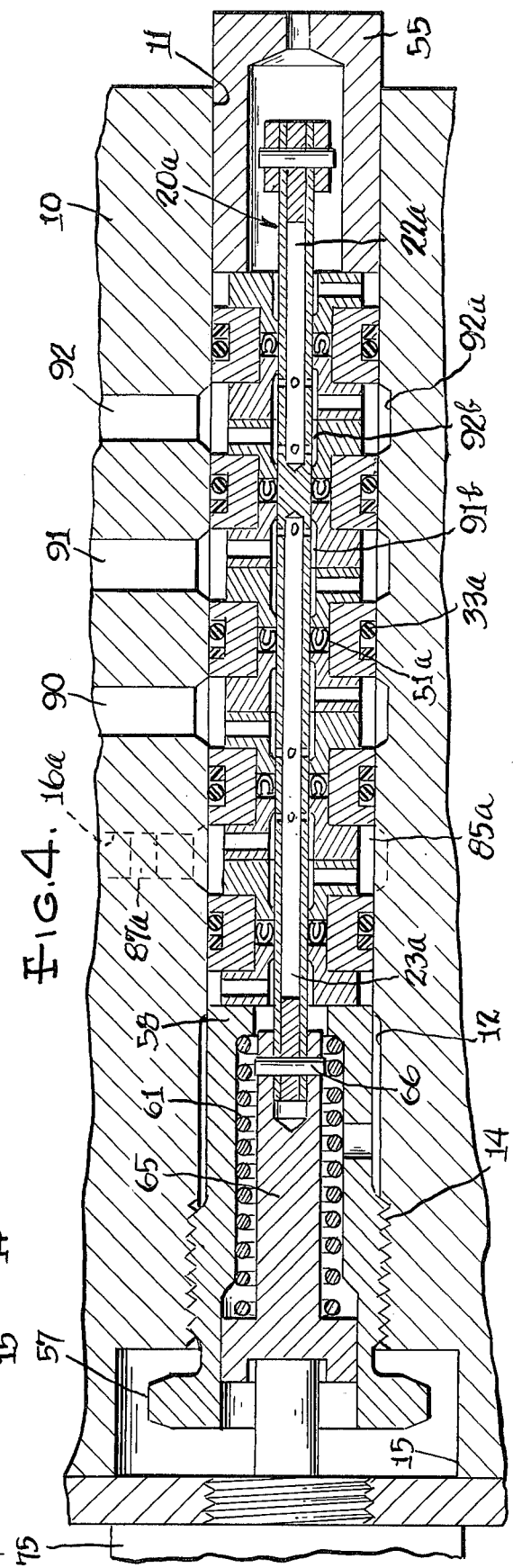

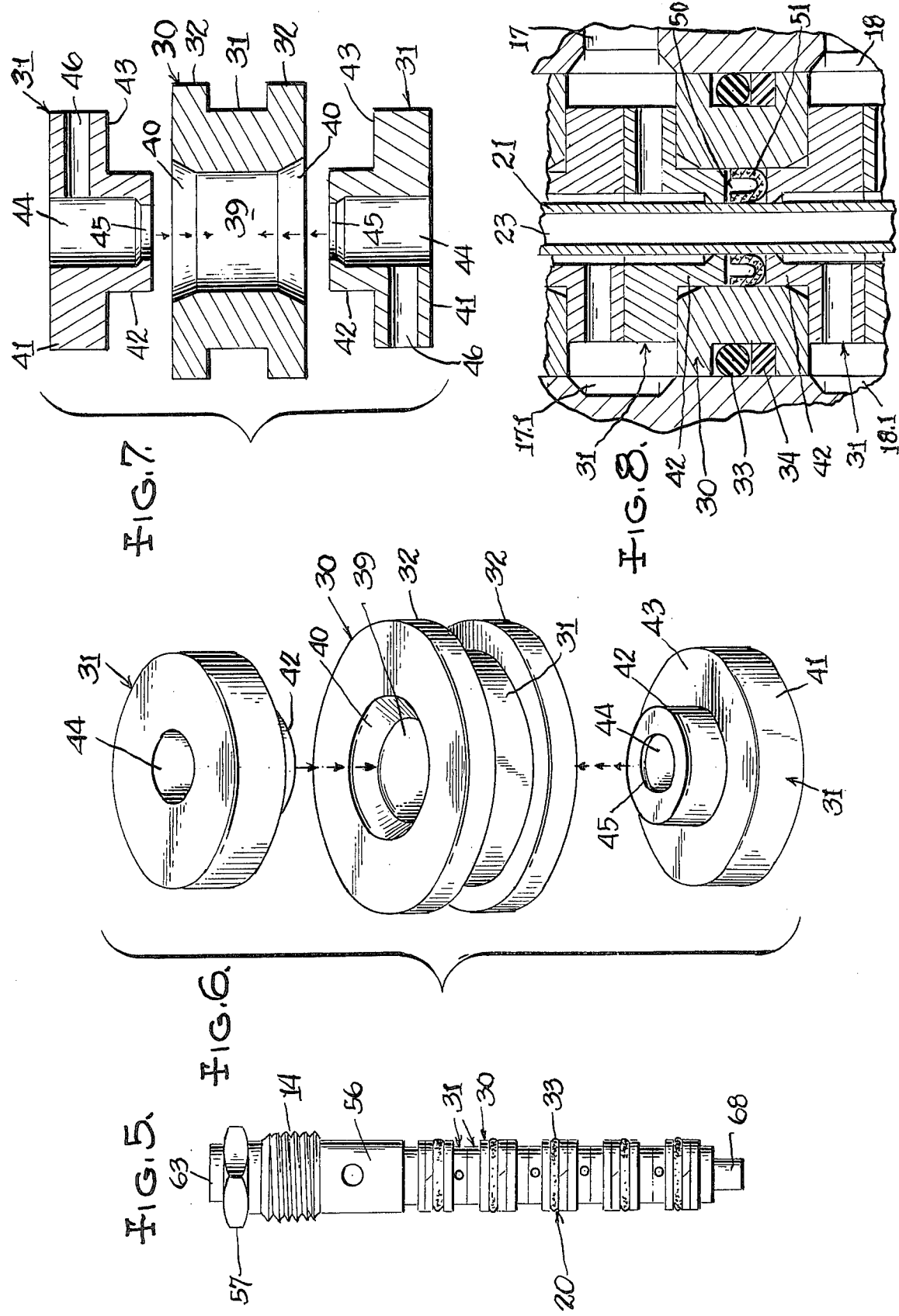

CARTRIDGE VALVE

BACKGROUND AND SUMMARY

The prior art contains patents which utilize a plurality of similar separators disposed within a valve body bore to form ports cooperable with a radially ported plunger, and some of such patents are listed as follows:

U.S. Pat. No. 2,645,450 — Chessman — Jul 14, 1953
U.S. Pat. No. 2,822,824 — Glower — Feb 11, 1958
U.S. Pat. No. 2,993,510 — Collins — Jul 25, 1961
U.S. Pat. No. 3,016,917 — Hunt — Jan 16, 1962
U.S. Pat. No. 3,422,852 — Ney — Jan 21, 1969

However, such prior art construction do not make it possible to form a cartridge unit, as herein provided, wherein the unit may be assembled outside of the valve body, and moved into or removed from the bore in the body as a unit. This not only reduces assembly operations and thus labor, but also makes maintenance of the valve a relatively simple matter, since the cartridge unit may be easily withdrawn from the valve body for inspection or repair.

The construction herein disclosed is ideally suited to provide a three-way, two-position valve, and one valve of this type will replace two valves heretofore used as pilot valves, which latter valves are of the two-way, two-position type. The improved construction also provides a balancing chamber within the valve to insure pressure within an axially ported plunger, so that the plunger packings are lifted away from ports during shifting of the plunger to thus minimize wear and tear on the packings.

Our invention also provides a cartridge unit which may be used with a valve body having port connections communicating with fluid pressure, cylinder and tank in different relationships, the cartridge unit being composed of the same number of glands and separators in the same relationship, with certain seals disposed in opposite manner.

DESCRIPTION OF THE DRAWINGS

In the drawings accompanying this specification and forming a part of this application, there is shown, for purpose of illustration, an embodiment which our invention may assume, and in these drawings:

FIG. 1 is a longitudinal sectional view of a three-way, two-position valve of the normally closed type, showing the valve plunger in its normal position, parts of the valve body and the actuating solenoid being broken away, FIG. 2 is a view similar to FIG. 1, but showing the valve plunger shifted to valve-open position, FIG. 3 is a view similar to FIG. 1 but showing a normally open valve in normal position, FIG. 4 is a view similar to FIG. 3 but showing the valve plunger shifted to a valve-closed position, FIG. 5 is an elevational view of the cartridge unit, drawn to a reduced scale with respect to the scale of the views shown in FIGS. 1 through 4.

FIG. 6 is an enlarged, perspective view of one gland and two separators, used in multiple in my improved valve, FIG. 7 is a separated longitudinal sectional view of the gland and separators shown in FIG. 6, illustrating interior details, and FIG. 8 is an enlarged fragmentary view of the parts shown in FIG. 7 in assembled relation within the bore of a valve body.

DESCRIPTION OF THE PREFERRED EMBODIMENT

With reference to the drawings, the valve therein shown comprises a valve body 10 which may be in the form of a block of metal adapted to be connected to the body of a larger valve and adapted to serve as a pilot valve for the latter, (as shown in said Collins patent) or the body 10 may be adapted for separate control of pressurized fluid. In any event, the body 10 is formed with a cylindrical bore 11 which preferably extends entirely through the body. At one end (the left hand end in the drawings) the bore is enlarged at 12 and threaded at 14, and further enlarged at 15, for a purpose to appear. The body has three transverse bores or ports, 16, 17, and 18, each having an annular chamber 16.1, 17.1 and 18.1 in communication with the bore 11.

A complete cartridge unit 20 is adapted to be inserted into the bore 11 from the enlarged end 15 thereof. The unit 20 comprises a hollow valve plunger 21 which is circular in cross-section and preferably formed of stainless steel. The plunger has a relatively short axial bore 22 leading into one end and a larger axial bore 23 leading into the other. The bores 22 and 23 are blocked from communication with each other by an integral section 24 of the plunger. The bore 22 has spaced sets of radial ports 25 and 26 and the bore 23 has spaced sets of radial ports 27, 28 and 29, for a purpose to be disclosed.

The cartridge unit further comprises a plurality of similar glands 30 and separators 31, the number of glands and separators being determined by the type of valve to be formed. In the three-position, two-way valve shown in FIGS. 1 through 4, there are ten separators and five glands. If a two-position, two-way valve were to be formed, the cartridge unit would utilize six separators and three glands, and the valve body would be suitably ported to cooperate therewith.

The separators and glands are preferably formed of stainless steel and are shown in detail in FIGS. 6 and 7, and in combination with the valve body, the plunger, and seals in FIG. 8. Each gland 30 is cylindrical and has an annular undercut 31 intermediate its ends. The circular end portions 32, 32 are of a diameter to closely but slidably fit within the bore 11 of the valve body 10. An O-ring 33 seals the gland 30 within the valve body bore, and a split ring 34 serves as a high pressure backup for the O-ring and is preferably made of Teflon to provide for sliding movement of the cartridge unit as it is assembled into the valve body bore. Each gland 30 has a central circular opeing 39 and, at each end, the opening 39 is tapered to flare outwardly, as best seen at 40 in FIG. 7.

Each separator 31 has a cylindrical head portion 41 of a diameter substantially equal to the diameter of the annular undercut portion 31 of a gland 30, although this diameter may vary slightly without impairing the function of the separator. Each separator also has an integral stem portion 42 which is of a smaller diameter than the head portion to form a shoulder 43 therebetween. The separator has a circular central opening 44 therein which merges with a slightly smaller diameter 45 at its end, the latter diameter closely but slidably passing the valve plunger 21. A transverse opening 46 is formed in the head portion to communicate with the central opening 44.

As best seen in FIG. 8, a separator 31 has its stem portion 42 closely fitting within one end of a gland 30, and a similar separator has its stem portion closely fitting within the opposite end of the gland, the shoulders 43 on the separators abutting respective end faces of the gland so that a space 50 is provided between end faces of the stem portions. A dynamic seal 51 is disposed within the space 50, the seal bring of commercial construction and may be of the type manufactured by the Fluorocarbon Company. As seen in FIG. 8, the seal 51 is C-shaped in cross-section and preferably made of Rulon A.

In either the normally closed, three-way, two-position valve shown in FIGS. 1 and 2, or the normally open, three-way, two-position valve shown in FIGS. 3 and 4, the cartridge unit includes five glands 30 and ten separators 31 arranged in the same manner and interfitting as above described. With reference to any one of FIGS. 1 and 4, it will be seen that the cartridge unit comprises a left hand separator 31, a gland 30, a pair of separators 31 with faces of their head portions 41 in abutment, another gland, a pair of separators, a gland, a pair of abutting separators, a gland, another pair of abutting separators, a final gland, and a right hand separator.

Insertion of the cartridge unit 20 into the valve body bore is limited by a hollow plug 55 fixedly held in predetermined position in the right hand end of the valve body bore 11 in any suitable manner, such as by a force fit, threading, pinning or the like. As shown, the face of the head 41 of the right hand separator bears against a face of the plug 55. A cartridge nut 56 is threaded into the internal threads 14 in the valve body bore, the nut 56 having wrench flats 57 at its outer end and this end is disposed within the large counterbore 15 of the valve body. An inner end 58 of the nut is slidably received within the valve body bore 11 and bears against the head portion of the left hand separator 31. The nut 56 is turned into the threads 14 until the right hand separator firmly bears against the face of the plug, whereupon the cartridge unit is disposed in predetermined position within the valve body bore, with separators and glands held against axial separation.

In the normally closed valve shown in FIGS. 1 and 2, the transverse body bore 16 is connected to a source of fluid under pressure. The abutting head portions of the left hand pair of separators are in radial alignment with the annular bore chamber 16.1 so that the openings 46 therein are in communication with such chamber. It will be noted that the central openings 44 and smaller diameters 45 of the two separators form an annular chamber 16.2 about the valve plunger 21.

In the construction shown in FIGS. 1 and 2, the transverse body bore 17 is connected to the cylinder to be controlled, which may be an actuating cylinder of a main valve. The bore 18 is connected to return or tank. The abutting head portions of the second (from the left) pair of separators are in radial alignment with the annular bore chamber 17.1 so that the radial openings 46 therein are in communication with such chamber. The central openings 44 and smaller diameters of the second pair of separators form an annular chamber 17.2 about the valve plunger. The abutting head portions of the third (from the left) pair of separators are in radial alignment with the annular bore chamber 18.1 so that the radial openings 46 therein are in communication with such chamber. A chamber 18.2 is formed in the manner disclosed. The fourth or right hand pair of separators form a chamber 18.3.

The cartridge nut is hollow and has an opening 60 at its inner end to pass the valve plunger 21. The nut has an enlarged opening to receive a coil spring 61 and a further enlarged opening 62 to closely but slidably receive the cylindrical head 63 of an operating plunger 64. The plunger has a stem 65 which is reduced in diameter to provide space for the coil spring. The left hand end of the plunger has a pin connection 66 with the adjacent end of the valve plunger 21. As shown in the drawing, the pin passes through the plunger and through a plug 67 which seals the opening into the plunger. At the opposite or right hand end of the valve plunger, a short sleeve 68 has a pin connection 69 with the plunger, the pin passing through the plunger and through a plug 70 which seals the opening into the plunger.

To assemble the component parts of a cartridge, the operating plunger 64 is pinned to the valve plunger 21 and the coil spring 61 is disposed about the operating plunger. The valve plunger is then inserted through the opening 60 and the separators 31, seals 51 and glands 30 are inserted over the valve plunger in predetermined sequence, the glands having the O-ring seals 33 and backup rings 34 already installed thereon. After the last separator has been installed on the valve plunger, the sleeve 68 is fitted over the valve plunger end and the pin 69 is seated in position.

The cartridge is then complete and ready for installation as a unit with the valve body bore 11. It is assumed that the hollow plug 55 has been fixed within the bore so that its inner end face is a predetermined distance from the valve body port 18. The cartridge then is inserted into the valve body bore from the left, as viewed in the drawings, and the nut 56 is threaded home so that its inner end face bears against the face of the adjacent separator to firmly clamp all separators and glands in rigid face-to-face relationship between the nut 56 and the inner end face of the hollow plug 55. The separators and glands are now in predetermined position with respect to the valve body ports 16, 17 and 18, and the valve plunger 21 is urged to the left by the coil spring.

In FIG. 1, the valve is in normally closed position. Pressure fluid entering body port 16 and chamber 16.1 will communicate with plunger bore 22 through transverse openings 46 in the separators aligned with the port 16, through the chamber 16.2 and radial ports 25 and 26. However, as seen in FIG. 1, pressure fluid is blocked from flow to the cylinder port 17. In the normally closed position shown in FIG. 1, the cylinder is connected to return or tank, since the radial port 27 in the valve plunger is in communication with valve body port 17, through separator chamber 17.2, transverse openings 46 in the related separators and annular body chamber 17.1, and radial port 28 in the valve plunger is in communication with valve body port 18, through separator chamber 18.2 transverse openings 46 in the related separators, and annular body chamber 18.1. Radial port 29 in the valve plunger is in communication with what is termed a balancing chamber 85 to exert pressure on the dynamic seals on opposite sides of the separator chamber 18.3. Without the balancing chamber, certain of the radial ports of the valve plunger could be at zero pressure and, as the valve plunger is shifted, such port will travel across a seal and cut into the latter.

The valve plunger may be moved from normally closed position in any suitable manner. For example, it may be moved manually, as shown in the Chessman patent, supra. However, it is preferred to move the valve plunger by means of a solenoid 75 which has a stub 76 threaded into a plate 77, the latter being secured to the adjoining face of the valve body 10. The outer face of the operating plunger 64 is recessed, as shown at 78, to receive the end of the core 79 of the solenoid. When the solenoid is energized, its core 79 shifts to the right, as shown in FIG. 2, to force the operating plunger 64 and connected valve plunger 21 to valve open position. In such position, the radial port 25 in the valve plunger remains in communication with pressurized fluid in body port 16, through separator chamber 16.2, transverse openings 46 in the related separators and annular body body chamber 16.1. Radial port 26 of the valve plunger has been moved so that it is in communication with the cylinder body port 17, through separator chamber 17.2, annular body chamber 17.1 and transverse openings 46 in the related separators. It will be noted that no radial ports of the valve plunger are in communication with the separator chamber 18.2 leading to the tank port 18, so that fluid passage to this port is blocked. However, pressurized fluid will flow through the bore 23 of the valve plunger to radial ports 28 and 29 which are aligned with separator chamber 18.3. This will cause fluid pressure to be exerted in the balancing chamber 85 and on the dynamic seals 51 which are disposed on opposite sides of the related pair of separators.

The valve structure shown in FIGS. 1 and 2 may easily be converted from normally open to the normally closed condition shown in FIGS. 3 and 4. In this case, the balancing chamber 85a is at the left side (as viewed in the drawing) of the valve bore 11. The body port 90 will now be connected to return or tank; the body port 91 will remain connected to the cylinder; and the body port 92 will be connected to a source of fluid under pressure. The valve body is shown to have three ports and in such case a different valve body would be required for a normally open valve since, as shown in full lines, the three body ports 16, 17 and 18 are located differently than the ports 90, 91 and 92. However, by simple modification, the same valve body may be used for both normally closed and normally open valves. Such modification comprises the drilling of four ports in the valve body. In the normally closed condition of FIGS. 1 and 2, the ports 16, 17 and 18 would be utilized, and a fourth port 86 (shown in dotted lines) would be blocked by a plug 87 to provide the balancing chamber 85.

To convert the valve body for normally open use, in such modification, the plug 87 would be removed from the body port 86, and this port would then correspond to port 92 and would be connected to a source of fluid under pressure. The body port 16a (shown in dotted lines and corresponding in position to former port 16) would be blocked by a plug 87a to form the balancing chamber 85a. The ports 90 an 91 would respectively be connected to tank and cylinder.

In any event, the same cartridge unit 20 is used in the normally open valve, with minor modifications. As seen in FIGS. 3 and 4, a valve plunger 20a is utilized, that has the bores 22a and 23a turned end-for-end from their position shown in FIGS. 1 and 2. Otherwise, the valve plunger is connected to and cooperates with related parts in the same manner as before described. In the normally closed valve, the same number of separators and glands are used, and these are disposed on the valve plunger in the same manner as before. The only other change is that the dynamic seal 51a is reversed to face in an opposite direction from its position shown in FIGS. 1 and 2, and the static seal 33a and its related split ring are reversed.

In the normally open position shown in FIG. 3, fluid under pressure will flow through body port 92, through the annular body chamber 92a and separator transverse openings and separator chamber 92b, through radial port 25a of the valve plunger, plunger bore 23a, radial port 26a to the body port 91 connected to cylinder. It will be noted that radial port 27a is also in communication with separate chamber 91b so that fluid under pressure will be present in plunger bore 23a to pressurize the dynamic seals in the balancing chamber 85a.

When the valve plunger is shifted to the closed position shown in FIG. 4, fluid pressure will be blocked from entering the bore 23a of the valve plunger. The cylinder port 91 in this position will be connected to tank port 90 and the pressure of fluid in this position will also exist in the balancing chamber 85a.

We claim:
1. A fluid control valve, comprising:
   a valve body having a bore, and a plurality of lateral ports spaced-apart in a direction axially of said bore and each communicating therewith,
   a cartridge comprising an axially reciprocable, cylinderical valve plunger, a plurality of similar separators and a plurality of similar glands surrounding said plunger in predetermined sequence axially of the latter,
   said glands each being of an external diameter to closely but slidably fit within said body bore and carrying sealing means on an exterior surface to seal against fluid flow along said bore, each of said glands having a circular opening of a diameter larger than the external diameter of said valve plunger,
   said separators each having a head portion of a diameter smaller than said body bore but larger than the opening in a gland, and each having a stem portion adapted to closely but slidably fit within an end of a gland opening,
   each separator having a circular opening of a larger diameter than the external diameter of said valve plunger, such opening extending from the side face at said head portion toward but short of the opposite side face at said stem portion and merging thereat with a smaller diameter portion which closely but slidably fits over said valve plunger,
   said separators and said glands being arranged in sequence on said valve plunger and stationary within said body bore with a pair of separator head portions on opposite side faces of a respective one of said glands and with side faces of adjoining head portions in abutment, said stem portions of the separators on opposite sides of a gland closely but slidably fitting within opposite ends of a respective gland opening, the end faces of such stem portions being held from abutment to provide an annular space therebetween, and a seal within each such space to seal against fluid flow along the exterior surface of said plunger,
   said separator circular openings providing annular chambers about said valve plunger, which chambers are separated axially along said plunger and which communicate with respective ports of said valve body, and
   said valve plunger being hollow and having radial ports cooperable with said seperator chambers to regulate flow of fluid between said valve body ports.

2. The construction according to claim 1 wherein said glands and said separators are assembled on said valve plunger and insertable as a unit within said valve body bore.

3. The construction according to claim 2 wherein said valve plunger has an end projecting beyond a foremost separator at adjacent end of said cartridge, and an abutment on said plunger one end adapted to engage the side face of said separator to limit axial movement of said plunger in one direction,
  said valve plunger having its opposite end projecting beyond rearmost separator at the adjacent opposite end of said cartridge,
  and an operating plunger connected to said valve plunger opposite end,
  means for holding said cartridge within said body bore with adjoining separator heads in firm abutting relation, and
  means for axially reciprocating said valve plunger.

4. The construction according to claim 3 wherein said operating plunger is axially reciprocable within a hollow cartridge nut, said nut having external threads fitting internal threads in said valve body bore,
  said nut having a portion engaging against the side face of said rearmost separator head to pressing thereagainst to maintain all separators and glands in fixed and in interabutment between said nut portion and in abutment face in fixed relation with said body parts.

5. The construction according to claim 4 wherein a coil spring surrounds said operating plunger and is operable to urge said valve plunger in said one direction.

6. The construction according to claim 5 wherein a solenoid is operable, when energized, to move said valve plunger in an opposite direction.

7. The construction according to claim 1 wherein each separator head portion has a lateral opening establishing fluid communication between the separator chamber and a respective body part.

8. A three-way, two-position fluid control valve, comprising:
  a valve body having a bore, and three lateral ports spaced-apart in a direction axially of said bore and each communicating therewith, a first port adapted to be connected to a source of fluid under pressure, a second port adapted to be connected to a cylinder to be operated, and a third port adapted to be connected to return,
  a cartridge comprising an axially reciprocable, cylindrical valve plunger, a plurality of similar separators and a plurality of similar glands surrounding said plunger in predetermined sequence in a direction axially of the latter,
  said cartridge being inserted within said bore in predetermined axial disposition to dispose said separators in radial alignment with respective valve body ports and with a balancing chamber in said valve body which is spaced from a body port,
  each of said separators having an opening to closely but slidably surround said valve plunger, and said opening having an enlargement to form an annular chamber about said valve plunger, each separator having a lateral opening to afford fluid communication beteen said chamber and a respective body port and said balancing chamber,
  said glands being positioned between said separators in face-to-face engagement therewith, each gland having an external diameter to fit within said body bore and a static seal on its exterior surface to engage with said body bore and seal against fluid passage therealong, and each gland having an axial opening therein with end portions of said separators fitting therein but with facing surfaces in spaced relation to provide an annular space, and a dynamic seal within each space to seal against fluid flow along the exterior surface of said valve plunger,
  said valve plunger being hollow and having radial ports cooperable with said separator chambers to regulate flow of fluid between said body ports and said balancing chamber.

9. The construction according to claim 8 wherein said valve plunger radial ports are disposed in predetermined axial relation with said separator chambers,
  wherein in one position of said valve plunger fluid pressure from said first port is blocked and the cylinder port, the return port and said balancing chamber are in fluid communication.

10. The construction according to claim 9 wherein in the other position of said valve plunger fluid pressure from said first port is communicated to said cylinder port and said balancing chamber, and said return port is blocked.

11. The construction according to claim 8 wherein said valve plunger has a long bore and a short bore blocked from communication with each other, each of said bores having radial ports therein,
  said valve being convertible from a normally open to a normally closed valve by inserting the long and short bores of a valve plunger while maintaining said separators and glands in the same relation on said plunger.

12. The construction according to claim 8 wherein said glands and separators and seals are assembled on said valve plunger in predetermined sequence, and said plunger is insertable as a unit within said valve body bore.

13. The construction according to claim 8 wherein said valve body is formed with four lateral spaced ports, one being blocked by a plug to provide said balancing chamber.

14. The construction according to claim 13 wherein the balancing chamber is at one end of the bore in a normally closed valve and at the opposite end of the bore in a normally open valve, and wherein the same valve body may be used for either type of valve, the body port at opposite ends of said bore being selectively plugged to provide proper disposition of said balancing chamber.

15. A three-way, two-position fluid control valve, comprising:
  a valve body having a bore, and three lateral ports spaced-apart in a direction axially of said bore and each communicating therewith, a first port adapted to be connected to a source of fluid under pressure, a second port adapted to be connected to a cylinder to be operated, and a third port adapted to be connected to return,
  a cartridge comprising an axially reciprocable, cylindrical valve plunger, a plurality of similar separators and a plurality of similar glands surrounding said plunger in predetermined sequence axially of the latter, said glands each being of an external diameter to closely but slidably fit within said body bore and carrying a static seal on an exterior surface to seal against fluid flow along said bore, each of said glands having a circular opening of a diameter larger than the external diameter of said plunger, said separators each having a head portion of a diameter smaller than said body bore but larger than an opening in a gland, and each having a stem portion adapted to closely but slidably fit within an end of a gland opening, each separator having a circular opening of a larger diameter than the external diamter of said valve plunger, such opening extending from a side face at said head portion toward but short of the opposite side face at said stem portion and merging thereat with a smaller diameter portion which closely but slidably fits over said valve plunger, said separators and glands being arranged in sequence on said valve plunger with a pair of separator head portions on opposite side faces of a respective one of said glands and with side faces of adjoining head portions in abutment, said stem portions of each said pair of separators closely but slidably fitting within opposite ends of the respective gland opening, the end faces of such stem portions being held from abutment to provide an annular space therebetween, and a dynamic seal within such space to seal against fluid flow along the exterior surface of said plunger, said circular openings in paired separators combining to form an annular chamber about said valve plunger, said glands and separators being held in fixed predetermined position within said body bore so that the annular chambers of paired separators are in radial alignment with respective ones of first, second and third ports and adapted for selective fluid communication therewith, said valve plunger being hollow and having radial ports cooperable with said separator chambers to regulate flow of fluid between said body ports.

16. The construction according to claim 15 wherein a balancing chamber is formed in said body bore at one end thereof and in predetermined axially spaced relation with respect to one of said body ports, and wherein one of said separator chambers is disposed in alignment with said balancing chamber and in communication therewith, the radial ports in said valve plunger providing for flow of fluid to said balancing chamber.

* * * * *